(12) United States Patent
Kirkham

(10) Patent No.: US 10,878,036 B2
(45) Date of Patent: Dec. 29, 2020

(54) MAINTAINING CHARACTER SET COMPATIBILITY IN DATABASE SYSTEMS

(71) Applicant: Actian Corporation, Palo Alto, CA (US)

(72) Inventor: Ian Philip Kirkham, Stinchcombe (GB)

(73) Assignee: Actian Corporation, Palo Alto, CA (US)

( * ) Notice: Subject to any disclaimer, the term of this patent is extended or adjusted under 35 U.S.C. 154(b) by 357 days.

(21) Appl. No.: 15/873,843

(22) Filed: Jan. 17, 2018

(65) Prior Publication Data

US 2019/0220548 A1 Jul. 18, 2019

(51) Int. Cl.
*G06F 16/00* (2019.01)
*G06F 16/903* (2019.01)
*G06F 16/23* (2019.01)
*G06F 16/16* (2019.01)
*G06F 16/904* (2019.01)
*G06F 16/9032* (2019.01)
*G06F 16/2455* (2019.01)
*G06F 16/25* (2019.01)

(52) U.S. Cl.
CPC ...... *G06F 16/90335* (2019.01); *G06F 16/164* (2019.01); *G06F 16/23* (2019.01); *G06F 16/2455* (2019.01); *G06F 16/258* (2019.01); *G06F 16/904* (2019.01); *G06F 16/9032* (2019.01)

(58) Field of Classification Search
CPC .... G06F 16/164; G06F 16/23; G06F 16/9032; G06F 16/90335; G06F 16/904; G06F 16/2455; G06F 16/258
See application file for complete search history.

(56) References Cited

U.S. PATENT DOCUMENTS

| 5,812,964 | A | * | 9/1998 | Finger | G06F 16/252 704/7 |
|---|---|---|---|---|---|
| 5,873,111 | A | * | 2/1999 | Edberg | G06F 40/53 715/202 |
| 5,929,792 | A | * | 7/1999 | Herriot | G06F 40/126 341/55 |
| 6,453,356 | B1 | * | 9/2002 | Sheard | G06F 8/34 709/231 |
| 6,460,015 | B1 | * | 10/2002 | Hetherington | G06F 40/129 704/8 |
| 9,471,617 | B2 | * | 10/2016 | Mielenhausen | G06F 16/2329 |
| 9,665,601 | B1 | * | 5/2017 | Hillyard | G06F 16/211 |

(Continued)

*Primary Examiner* — Shiow-Jy Fan
(74) *Attorney, Agent, or Firm* — Fenwick & West LLP

(57) ABSTRACT

Database systems handle queries represented in different character sets. A database system allows data stored in the same database column to be represented in different character sets. In response to a query, the database system returns query results in the same character set as the received query even though the data stored in the database column is in a different character set. The database system creates and maintains a metadata table that stores attributes of database columns. The attributes of database columns include, among others, a data type, and a collation attribute. By tracking the collation attributes for data stored in database columns, the database system determines whether to convert data stored in a database column when processing database queries.

20 Claims, 5 Drawing Sheets

(56) References Cited

U.S. PATENT DOCUMENTS

| | | | | |
|---|---|---|---|---|
| 2003/0217071 A1* | 11/2003 | Kobayashi | .............. | G06F 40/58 |
| 2005/0171942 A1* | 8/2005 | Ohtani | ............... | H04N 1/00244 |
| 2005/0289168 A1* | 12/2005 | Green | ................... | G06F 16/951 |
| 2016/0171067 A1* | 6/2016 | Acker | .................... | G06F 16/27 |
| | | | | 707/627 |
| 2018/0096032 A1* | 4/2018 | Mielenhausen | ....... | G06F 16/252 |

* cited by examiner

MAINTAINING CHARACTER SET COMPATIBILITY IN DATABASE SYSTEMS

BACKGROUND

This disclosure relates generally to database systems and more specifically to supporting of character sets by database systems.

Databases store large amount of data for users across the globe. These users may speak and use different languages. It is therefore imperative to for databases to support different languages such that they can meet the users' demands. However, some legacy databases are configured to support character sets that do not support all languages used by different users. The process of converting data stored in these legacy databases from existing character sets to other character sets that support different languages is often time consuming. As a result, a database created with a particular character set may have to be shut down for long periods of time to perform an upgrade to be able to support a different character set. Several systems, for example, online systems often use databases continuously and are unable to afford long database shutdowns.

SUMMARY

Some database systems can handle certain character sets that were previously modeled. For example, some database systems can notionally support only data represented in a single system-wide presentation character set. Described herein are database systems that support data represented in different character sets. To extend their capability to handle additional character sets that are not modeled, database systems typically extend column definitions by modeling the character set along with other attributes such as the datatype, length, precision, collation etc. This solution requires invasive data structure changes to upgrade these legacy database systems. Database systems described herein do not require new data structures proliferated throughout them. Changes are localized and manageable.

Described herein are database systems that support data represented in different character sets. For example, a first column of a table may be stored using UTF-8 character set and another column of the table may be represented using NCS character set. A database system allows data stored in a database column using a first character set to be represented in a second character set. In response to a query, the database system returns query results in the second character set even though the data stored in the database column is in the first character set. In one implementation, the database system creates and maintains a metadata table that stores attributes of database columns. The attributes of database columns include, among others, a data type, and a collation attribute. The attributes may not include a character set because that requires system-wide data structure change. By checking the collation attributes for data stored in database columns, the database system can determine whether to convert character set of data stored in a database column when processing database queries. That is, the database system determines from the collation attribute a character set in which data is stored in a database column.

When processing a database query, the database system generates an execution plan for the database query and executes the execution plan. In an embodiment, the database system uses the value stored in a collation attribute of a column to indicate that the data of the column needs to be converted to a different character set during query processing. The database system includes a transliterate operator to convert data stored in one database column from one character set to another character set if the character set corresponding to the collation attribute value for the particular column differs from the character set used by a client a collation attribute value that corresponds to the character set for the particular column.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Database systems allow users to interact with the data stored in databases using a query interface or language, for example, the structured query language (SQL) interface. The SQL language allows users to specify database queries for accessing and manipulating data from a database system. A database system can provide results of queries using a character set that is different from the character set in which data is stored in the database system. As such, to process database queries from clients that use new character sets different from the character set used while creating the database system, the database system does not need to convert data stored in the storage system to the new character sets. The conversion of data stored in the storage system to the new character sets can be performed in segments incrementally, for example, by upgrading one column at a time. Embodiments also allow a database system to interact with a storage system that stores data in a character set that is different from the character set used by the database system.

Database System

Figure 1:
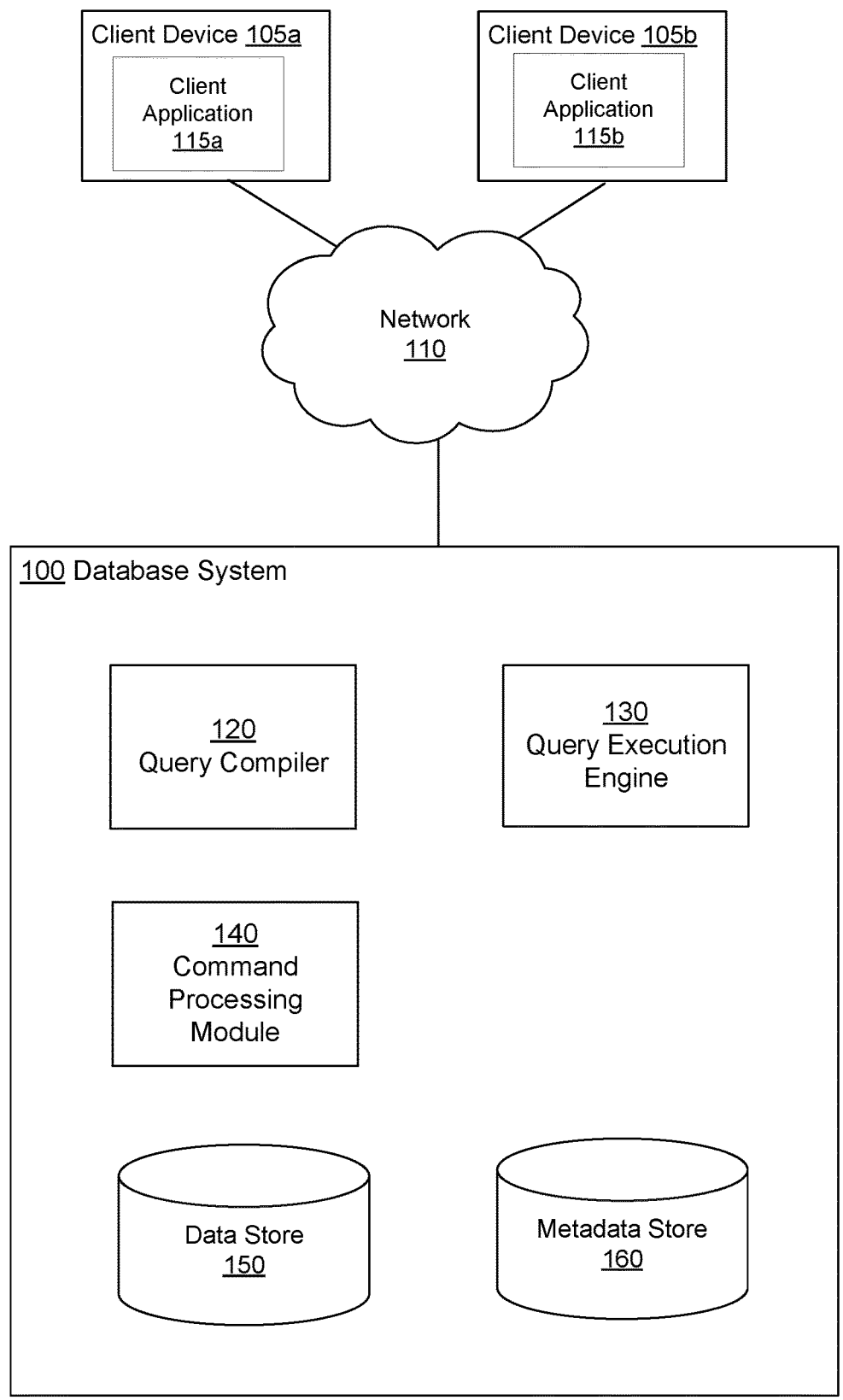
FIG. 1 shows the overall system environment illustrating the architecture of a database system, in accordance with an embodiment of the invention.

FIG. 1 shows the overall system environment illustrating the architecture of a database system 100, in accordance with an embodiment of the invention. The database system 100 has four main architectural components: a query compiler 120, a query execution engine 130, a command processing module 140, a data store 150, and a metadata store 160. (A letter after a reference numeral, such as "105a,"

indicates that the text refers specifically to the element having that particular reference numeral, while a reference numeral in the text without a following letter, such as "105," refers to any or all of the elements in the figures bearing that reference numeral.)

The database system 100 can include any type of processor, for example, standard x86 servers running Linux or multi-core systems. Users and applications may communicate with the database system 100 via standard interfaces, for example, ANSI SQL via ODBC/JDBC. The database system 100 is also referred herein as "the system" or "database."

The database system 100 performs processing and storing of data. The database system 100 controls sessions, parsing and optimizing queries, and scheduling execution of the workload. The database system 100 may be optimized for outward communication and handling of query overhead so the resources of the database system 100 are utilized for performing data operations.

The data store 150 stores data on a data storage device, for example, a disk. This data includes relations or tables comprising rows and columns of user data. For examples, example tables are t1, t2, t3, . . . , tn, where table t1 has columns a1, b1, c1, table t2 has columns a2, b2, c2, table t3 has columns a3, b3, c3, and so on unless indicated otherwise. In some embodiments, data stored in one column is of the same data attributes. For example, data stored in the same column is of the same data type, character set, and collation attribute value.

The metadata store 160 metadata associated with the data stored in the data store 150. In some embodiments, the metadata store 160 stores metadata for each column of the data table stored in the data store 150. Example metadata includes a data type of the data stored in a column, a collation attribute, and the like. A value of the collation attribute corresponds to a collation used with a particular character set. A collation is a set of rules for comparing characters in a character set.

The database system 100 maintains and updates the metadata (e.g., collation value) stored in the metadata store 160. As one example, if a database administrator requests to convert a character set associated with one column of a data table from the NCS character set to the UTF-8 character set, the database system 100 converts the data stored in the column from the NCS character set to the UTF-8 character set. In addition, the database system 100 updates the collation attribute value for the particular database column. The database system 100 updates the collation attribute value for the particular database column to a value that corresponds to the UTF-8 character set from a value that corresponds to the NCS character set. The request to convert the data stored in one column can specify when the conversion should take place. For example, a database administrator can issue one or more commands to convert data stored in one column from being represented in one character set to another character set at a particular time point (e.g., immediately, deferred at a future time point). The one or more commands, if executed, convert data stored in the column from being represented in the one character set to the other character set at the specified time point. In an embodiment, the database system 100 locks the column when the data of the column is converted from one character set to another character set so that queries are unable to process the column. In other embodiments, the entire table is locked when one or more columns of the table are being converted from a particular character set to another character set.

The metadata stored in the metadata store 160 provides a mechanism for the database system 100 to determine whether to convert data to a particular dataset stored in the database system 100 during query processing time. For a particular column, if a collation attribute value associated with the column differs from a collation attribute value corresponding to a character set associated with a client device 105, the database system 100 includes a transliterate operator in the queries for converting the data during query processing time to the character set used by the client device 105. For example, the client device 105 uses the NCS character set. As another example, the client device 105 uses the UTF-8 character set.

The query compiler 120 receives queries from client devices 105 and generates execution plans for the received queries. Users and applications can issue queries. For a particular query, the query compiler 120 compiles the query to generate an execution plan for execution of the query and performs any optimization if needed. An execution plan includes an ordered set of steps used to access data in the database system 100. The execution plan can include a complete set of physical operators for executing the database query and relationships between the physical operators. A physical operator produces an output data set from one or more input data sets. Hash join, sort merge join, index scan, or transliterate are some example physical operators. The query compiler 120 provides the execution plans to the query execution engine 130 for execution.

The query compiler 120 determines whether to include transliterate operators in an execution plan when generating an execution plan for a query. The query compiler 120 may compare the collation attribute value associated with the particular column to a collation attribute value corresponding to the character set associated with a client device 105 to make the determination. If the two collation attribute values are different, the query compiler 120 includes a transliterate operator in the execution plan that is to be applied to data stored in the particular column. If the two collation attribute values are the same, the query compiler 120 does not include a transliterate operator for the particular column in the execution plan. In one embodiment, the query compiler 120 compares the collation attribute value associated with the particular column to a predetermined collation attribute value to determine whether to include a transliterate operator in the execution plan. If the collation attribute value differs from the predetermined collation attribute value, the query compiler 120 includes a transliterate operator in the execution plan that is to be applied to data stored in the particular column. If the two collation attribute values are the same, the query compiler 120 does not include a transliterate operator in the execution plan. A query compiler 120 is further described in detail with respect to FIG. 2.

The code generator 280 receives an execution plan and translates the execution plan into sequences of query steps specified using executable code. The query execution engine 130 generates and executes the generated executable code. The query execution engine 130 implements the physical operators included in the execution plan. For example, if an execution plan includes a transliterate operator to be applied to a column, the query execution engine 130 converts data stored in the column from the current character set to another character set specified in the transliterate operator.

The command processing module 140 receives commands and processes the commands. Commands are instructions that are used to communicate with the database system 100 to perform specific tasks (e.g., administrative tasks) for configuring the database system 100. The commands may be received from client devices 105 and/or the query compiler 120. Create table, delete table, and alter table are some example commands. For example, to process a create table command, the command processing module 140 creates and stores a new table in the data store 150 according to the attributes specified in the create table command. The command processing module updates the metadata store 160 to store the metadata for the table that is created. To process a delete table command, the command processing module 140 removes a table from the data store 150. The command processing module 140 removes metadata associated with the table that is removed. To process an alter table command, the command processing module 140 updates an existing table that is stored in the data store 150 according to the attributes specified in the alter table command. An alter table command may modify a table by adding columns, deleting columns, or modifying existing columns. An alter table command may specify to modify attributes associated with a particular column, for example, a data type, a collation attribute, length of data stored in the column, name of the column, access rules associated with the column, constraints associated with the column, and the like. Embodiments support an alter table command that allows a character set of a column to be modified. If a database administrator requests to update the character set for a particular column from the character set NCS to the character set UTF-8 at a particular time point, the command processing module 140 converts the data stored in the particular column to from being represented in the NCS character set to the UTF-8 character set at the particular time point. The command processing module 140 additionally updates the metadata (e.g., the collation attribute associated with the column) in the metadata store 160 to a collation attribute value that corresponds to the UTF-8 character set to reflect that the particular column stores data that is in the character set UTF-8, after converting the data stored in the column.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interactions with the database system 100.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the database system 100 are typically performed via a network 110, for example, via the internet. The network 110 enables communications between the client device 105 and the database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

Query Compiler

Figure 2:
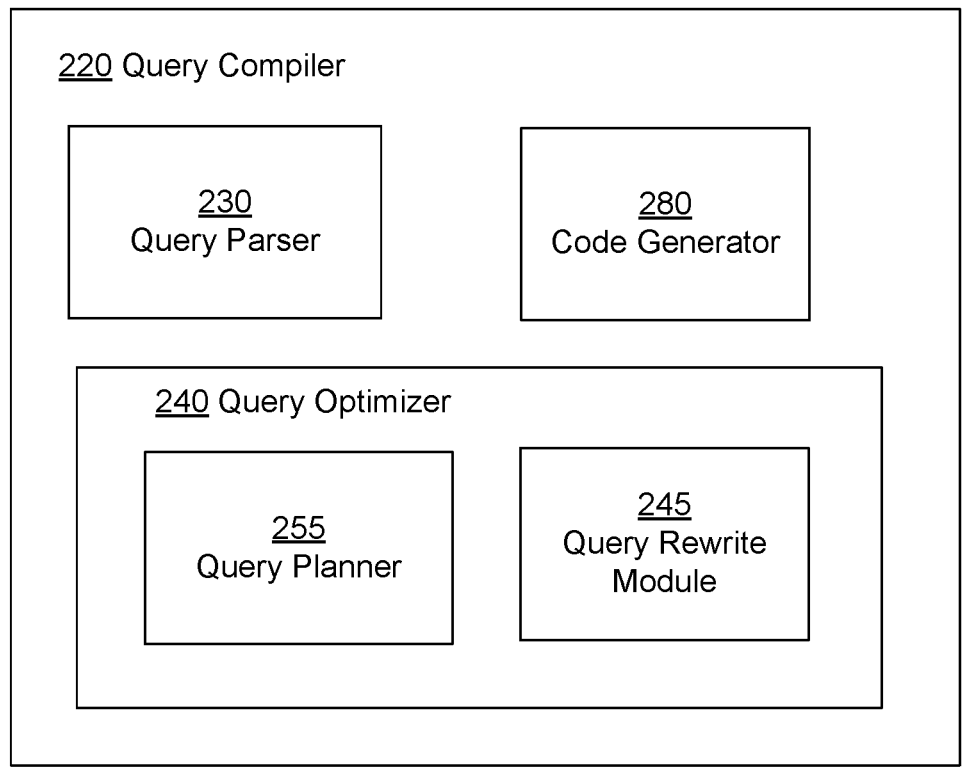
FIG. 2 is a high level block diagram illustrating the system architecture of a query compiler, in accordance with an embodiment.

FIG. 2 is a high level block diagram illustrating the system architecture of a query compiler, in accordance with an embodiment. The query compiler 220 includes a query parser 230, a code generator 280, and a query optimizer 240. The query parser 230 parses an input query to ensure that there are no syntax errors in the query. If a well-formed query is provided to the database system 100, the query parser 230 builds appropriate data structures to perform further processing of the query, for example, query optimization or code generation. The code generator 280 translates execution plans generated by the query optimizer into executable code.

The query optimizer 240 optimizes execution of the query. The query optimizer 240 includes a plan constraint parser 235, a query rewrite module 245, and a query planner 255.

The query rewrite module 245 performs transformations on the database query, for example, by rewriting the query to generate a transformed query that can be executed more efficiently. The query planner 255 generates a query plan for executing a database query. The query planner 255 may generate a query plan by traversing through a search space comprising various execution plans applicable to a given query. The query planner 255 may estimate costs of different solutions and compare different solutions based on the associated costs.

The query planner 255 further determines whether to convert stored data to a different character set in a query result. The query planner 255 may identify columns that include data that is relevant to the query. From the identified columns, the query planner 255 may further identify one or more columns in which the stored data is to be converted to a different character set. In some embodiments, the query planner 255 compares a collation attribute value associated with a column to a collation value corresponding to a character set value associated with the column to identity data stored in which column(s) is to be converted. In some embodiments, the query planner 255 compares a collation attribute value to a predetermined collation attribute value that corresponds to a predetermined character set value to make the identification. For each identified columns, the query planner 255 includes a transliterate operator in the generated query execution plan. For data obtained from each identified column for inclusion in the query result for the query, the transliterate operator converts the data to a different character set. In some embodiments, this character set corresponds to the collation attribute value associated with the column from which the data is obtained. In some embodiments, this character set is predetermined.

In some embodiments, the database system receives requests from a user, for example, the database administrator to execute one or more commands such as an alter table command to convert data stored in the identified columns to the appropriate character set. These operations require the database table or the specific columns being updated to be locked, thereby preventing any queries to the table or queries processing the columns being updated. The actual update of the column data can be a very slow operation, depending on the amount of data being stored in the column. For example, if the widths of a column needs to me increased, the data of the table may have to be copied to a new storage location that can accommodate the increased width. Typically, a database administrator may perform these operations when the load on the database system is low. In some embodiments, the data stored in the data table is converted to a different character set gradually over time, for example, a few columns at a time. When the conversion of all data stored in the column completes, metadata (e.g., the character set value, the collation attribute value) associated with a column is updated.

Execution of a Query in a Database System

The following steps detail the high-level operations that take place in processing a client request from its initial creation to sending results or status back to the client, to complete the request. After creating a process to maintain the connection with a new client, the database system 100 routes the requested operation (a SQL query or some other database operation) through the parser and optimizer to develop a query execution plan to perform or execute the specified query or database operation.

Figure 3:
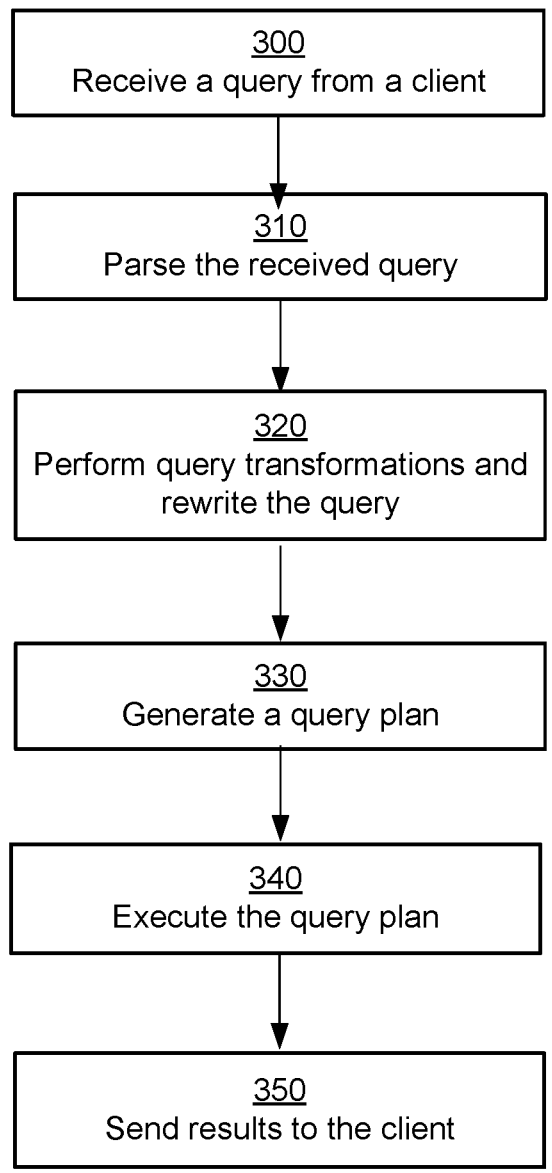
FIG. 3 shows a flowchart for illustrating the processing of a query in the database system, in accordance with an embodiment.

FIG. 3 shows a flowchart for illustrating the processing of a query in the database system, in accordance with an embodiment. These steps may be performed in orders other than those shown in FIG. 3. Furthermore, each step of the flowchart can be performed by modules different from those indicated below.

The database system 100 receives 300 a database query from a client 105, for example, an SQL query. The query parser 230 parses 310 the query received to generate a data structure representing the query. The query optimizer 240 performs 320 various transformations on the query, for example, by rewriting the query. The query planner 255 generates 330 a physical query plan for the input query. The physical query plan may specify execution choices, such as join type, join order, aggregation options, and data distribution requirements. The execution engine 250 executes 330 the execution plan. The code generator 280 translates the execution plan into sequences of query steps. The execution engine 250 generates and executes executable code. The execution engine 250 determines the result of execution of the query and sends 350 the result to the client that sent the query.

In an embodiment each query step corresponds to one or more operators in a query plan. Examples of query steps include, HASH, which builds hash table for use in hash joins, HJOIN, which executes hash join of two tables or intermediate result sets, MERGE, which merges rows derived from parallel sort or join operations, SCAN, which scans tables or intermediate result sets, either sequentially or with a range-restricted scan, SORT, which sorts rows or intermediate result sets as required by other subsequent operations (such as joins or aggregations) or to satisfy an ORDER BY clause, DIST, which distributes rows to nodes for parallel joining purposes or other parallel processing, and NLOOP, which executes a nested-loop join of two tables or intermediate result. Embodiments allow a user to use a command, for example, "explain" command that provides a description of the query plan generated.

Modify Collation Attribute in a Database System

Figure 4:
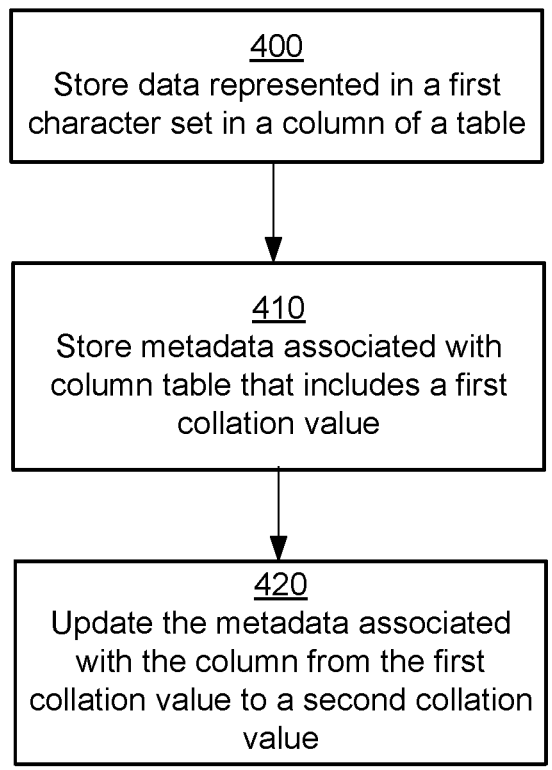
FIG. 4 shows a flowchart for illustrating the process of modifying collation attributes to represent a change in character set of a column in a database system, in accordance with an embodiment.

FIG. 4 shows a flowchart for illustrating the process of modifying collation attributes to represent a change in character set of a column in a database system, in accordance with an embodiment. These steps may be performed in orders other than those shown in FIG. 4. Furthermore, each step of the flowchart can be performed by modules different from those indicated below.

The database system 100 stores 400 data represented in a first character set in a column of a table. For example, all data that is stored in the column is in the first character set such as NCS. The database system 100 stores 410 metadata associated with the column. For example, the database system 100 stores a collation attribute value COLL_ATTR1 associated with the column COL1 to indicate that the collation attribute associated with the column corresponds to the character set "NCS."

The database system 100 updates 420 the metadata associated with the column from the first collation attribute value to a second collation attribute value. For example, the database system 100 updates the collation attribute value associated with the column COL1 from COLL_ATTR1 to COLL_ATTR2 to indicate that the collation attribute associated with the column corresponds to the character set "UTF-8." The update may be triggered by different events. The database system 100 may update the collation attribute value in response to an alter table command issued by a user such as an administrator of the database system 100.

In one embodiment, the database system 100 receives a request to store new data represented in the second character set "UTF-8" in the column. The database system 100 converts the new data to be represented in the first character set "NCS" and stores the converted data in the column of the data table.

Query Compilation in a Database System

Figure 5:
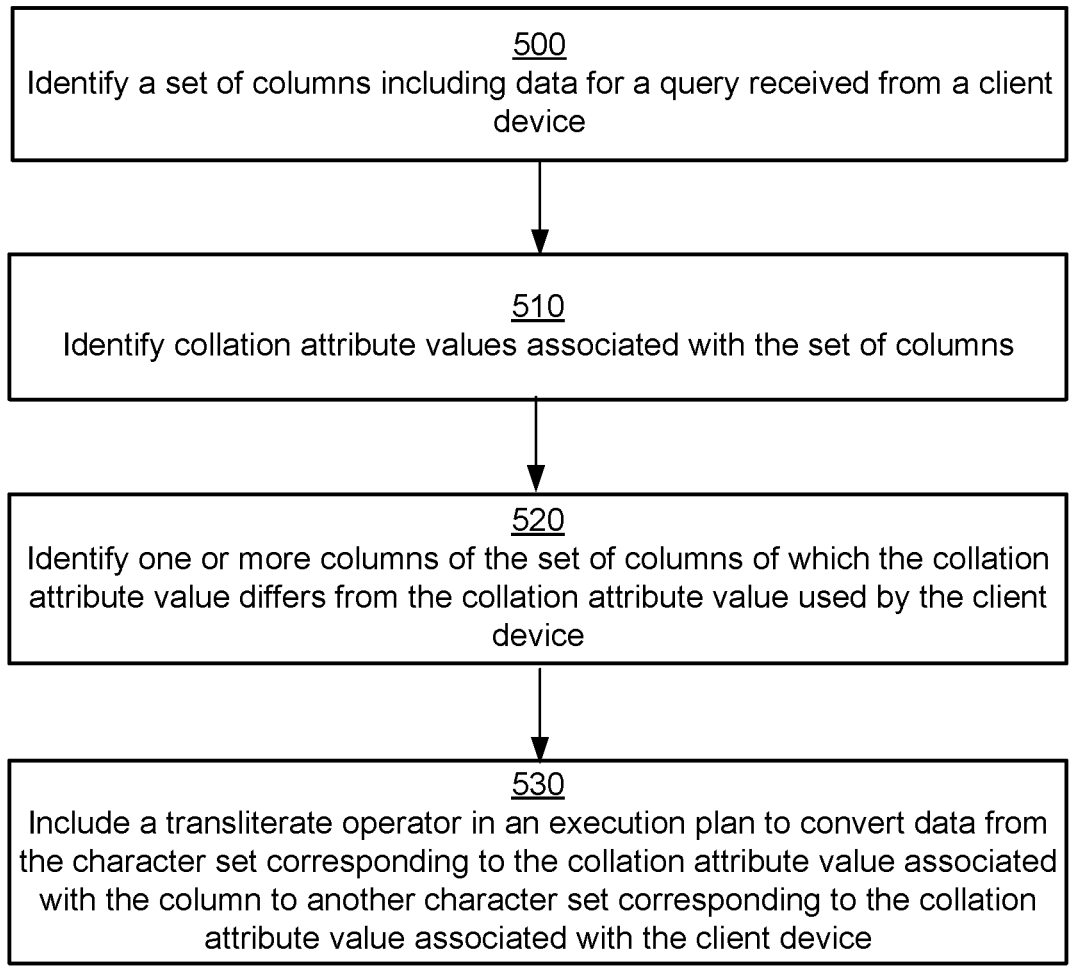
FIG. 5 shows a flowchart for illustrating the process of compiling a query to generate an execution plan using a transliterate operator, in accordance with an embodiment.

FIG. 5 shows a flowchart for illustrating the process of compiling a query to generate an execution plan, in accordance with an embodiment. These steps may be performed in orders other than those shown in FIG. 5. Furthermore, each step of the flowchart can be performed by modules different from those indicated below.

The database system 100 identifies 500 a set of columns of the data table that stores data relevant to a query received from a client device. The data system 100 identifies 510 collation attribute values associated with the set of columns, based on the metadata associated with the data table. The collation attribute values can be identified based on the column IDs associated with the set of columns. For each column, the database system 100 may compare a collation attribute value associated with the column to the collation attribute value associated with the client device. The database system 100 may obtain the collation attribute value associated with the client device from the client device. For example, the client device sends the collation attribute value to the database system 100. As another example, the client device sends the character set to the database system 100 and the database system 100 determines the collation attribute value from the character set received from the client device. The database system 100 may compare the collation attribute value associated with the column to a predetermined collation attribute value. In some embodiments, client devices use the same known character set and the predetermined collation attribute value corresponds to the known character set. The database system 100 identifies 520 one or more columns each of which the associated collation attribute value differs from the collation attribute value associated with the client. As one example, the database system 100 identifies a-n columns that store data relevant to the query. The client device is associated with collation attribute value COLL_ATTR1. The a-n columns are associated with the collation attribute value COLL_ATTR1 corresponding to the character set value CHAR_SET1. However, b, j, m columns are associated with the collation attribute value COLL_ATTR2 that corresponds to the character set value CHAR_SET2. The database system 100 identifies these three columns of which the associated collation attribute value differ from the collation attribute value CHAR_ATTR1.

The database system 100 includes 530 a transliterate operator in an execution plan for each identified column to convert data obtained from the column from the character set corresponding to the collation attribute value associated with the column to another character set corresponding to the collation attribute value associated with the client device. Continue with the previous example, for each of the b, j, m columns, the database system 100 includes a transliterate operator in an execution plan to convert the data obtained from the column from the character set corresponding to CHAR_SET2 to the character set corresponding to CHAR_SET1. The database system 100 includes the converted data in the query result and provides the query result to the client device that issues the query.

The database system 100 may further receive one or more commands to convert data stored in each identified column from the character set corresponding to the collation attribute value associated with the column to the other character set corresponding to the collation attribute value associated with the client device.

The database system 100 may execute the one or more commands to convert the data from the character set corresponding to the collation attribute value associated with the column to the other character set used by the client device. The database system 100 may execute the one or more commands concurrently with executing the execution plan generated for the query. That is, conversion of data stored in the columns is performed concurrently with processing of the query. The database system 100 may lock the data table to prevent data from being stored into the data table while converting the data.

The database system 100 may update the metadata associated with the column when all data stored in the column is converted to the other character set used by the client device. For example, the collation attribute value associated with the column is updated to the collation attribute value associated with the client device that corresponds to the character set used by the client device.

Alternative Applications

Several embodiments are described herein using a parallel database architecture. However, other embodiments based on a single processor architecture are foreseeable. Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

I claim:

1. A database system comprising:
a computer processor; and
a non-transitory computer-readable storage medium storing instructions configured to cause the computer processor to perform:
receiving a database query from a client application, the client application associated with a client collation attribute value;
identifying a set of columns from a database table, each of the set of columns storing data requested by the database query and associated with metadata comprising a collation attribute;
for each of the set of columns: comparing a collation attribute value associated with the column to the client collation attribute value associated with the client application, comprising:
comparing a first-column collation attribute value associated with a first column of the set of columns to the client collation attribute, and
comparing a second-column collation attribute value associated with a second column of the set of columns to the client collation attribute, the second-column collation attribute value different than the first-column collation attribute value;
identifying a subset of columns of the set of columns, each identified column associated with the collation attribute value different from the client collation attribute value associated with the client application, wherein the first column belongs to the identified subset of columns and the second column is outside of the identified subset of columns;

generating an execution plan for the database query, the generating comprising, for each identified column in the identified subset of columns, including in the execution plan, a transliterate operator configured to convert a character set of the data stored in the identified column, comprising:
responsive to determining that the first-column collation attribute value associated with the first column is different from the client collation attribute value, including in the execution plan, the transliterate operator configured to convert the character set of the data stored in the first column;
executing the execution plan to obtain a query result; and
providing the query result to the client application.

2. The database system of claim 1, wherein the instructions for executing the execution plan comprise instructions for:
obtaining data stored in each identified column of the identified subset of columns requested by the database query, the obtained data represented in a first character set corresponding to the collation attribute value associated with the column; and
executing the transliterate operator to convert the obtained data to data represented in a second character set used by the client application, the second character set corresponding to the client collation attribute value associated with the client application.

3. The database system of claim 1, wherein the instructions are further configured to cause the computer processor to perform:
receiving a request to convert the stored data of at least an identified column, the request for changing the character set of stored data of the identified column;
responsive to receiving the request:
converting data stored in the column from being represented in a first character set to a second character set, the first character set corresponding to the collation attribute value associated with the column, and the second character set used by the client application corresponding to the client collation attribute value associated with the client application, and
updating the collation attribute value associated with the column to the client collation attribute value associated with the client application.

4. The database system of claim 3, wherein the instructions are further configured to cause the computer processor to perform:
locking the database table during conversion of the character set of the stored data of the identified column.

5. The database system of claim 3, wherein the database query is a first database query, wherein the instructions are further configured to cause the computer processor to perform:
receiving a second database query processing an identified column of the database table; and
generating a second execution plan for the second database query, the second execution plan including no transliterate operator.

6. The database system of claim 3, wherein the instructions are further configured to cause the computer processor to perform:
responsive to determining that the conversion of the data stored in the column is complete, updating the collation attribute value associated with the column to the client collation attribute value associated with the client application.

7. The database system of claim 2, wherein the first character set is a national character set (NCS) and the second character set is a UTF-8 character set.

8. A non-transitory computer readable storage medium storing instructions thereon, the instructions comprise instructions for:
receiving a database query from a client application, the client application associated with a client collation attribute value;
identifying a set of columns from a database table, each of the set of columns storing data requested by the database query and associated with metadata comprising a collation attribute;
for each of the set of columns: comparing a collation attribute value associated with the column to the client collation attribute value associated with the client application, comprising:
comparing a first-column collation attribute value associated with a first column of the set of columns to the client collation attribute, and
comparing a second-column collation attribute value associated with a second column of the set of columns to the client collation attribute, the second-column collation attribute value different than the first-column collation attribute value;
identifying a subset of columns of the set of columns, each identified column associated with the collation attribute value different from the client collation attribute value associated with the client application, wherein the first column belongs to the identified subset of columns and the second column is outside of the identified subset of columns;
generating an execution plan for the database query, the generating comprising, for each identified column in the identified subset of columns, including in the execution plan, a transliterate operator configured to convert a character set of the data stored in the identified column, comprising:
responsive to determining that the first-column collation attribute value associated with the first column is different from the client collation attribute value, including in the execution plan, the transliterate operator configured to convert the character set of the data stored in the first column;
executing the execution plan to obtain a query result; and
providing the query result to the client application.

9. The non-transitory computer readable storage medium of claim 8, wherein the instructions further comprise instructions for:
obtaining data stored in each identified column of the identified subset of columns requested by the database query, the obtained data represented in a first character set corresponding to the collation attribute value associated with the column; and
executing the transliterate operator to convert the obtained data to data represented in a second character set used by the client application, the second character set corresponding to the client collation attribute value associated with the client application.

10. The non-transitory computer readable storage medium of claim 9, wherein the instructions further comprise instructions for:
receiving a request to convert the stored data of at least an identified column, the request for changing the character set of stored data of the identified column;

responsive to receiving the request:
    converting data stored in the column from being represented in a first character set to a second character set, the first character set corresponding to the collation attribute value associated with the column, and the second character set used by the client application corresponding to the client collation attribute value associated with the client application, and
    updating the collation attribute value associated with the column to the client collation attribute value associated with the client application.

11. The non-transitory computer readable storage medium of claim 10, wherein the instructions further comprise instructions for:
    locking the database table during conversion of the character set of the stored data of the identified column.

12. The non-transitory computer readable storage medium of claim 10, wherein the database query is a first database query, and wherein the instructions further comprise instructions for:
    receiving a second database query processing an identified column of the database table; and
    generating a second execution plan for the second database query, the second execution plan including no transliterate operator.

13. The non-transitory computer readable storage medium of claim 10, wherein the instructions further comprise instructions for:
    responsive to determining that the conversion of the data stored in the column is complete, updating the collation attribute value associated with the column to the client collation attribute value associated with the client application.

14. The non-transitory computer readable storage medium of claim 9, wherein the first character set is a national character set (NCS) and the second character set is a UTF-8 character set.

15. A computer-implemented method, comprising:
    receiving a database query from a client application, the client application associated with a client collation attribute value;
    identifying a set of columns from a database table, each of the set of columns storing data requested by the database query and associated with metadata comprising a collation attribute;
    for each of the set of columns: comparing a collation attribute value associated with the column to the client collation attribute value associated with the client application, comprising:
        comparing a first-column collation attribute value associated with a first column of the set of columns to the client collation attribute, and
        comparing a second-column collation attribute value associated with a second column of the set of columns to the client collation attribute, the second-column collation attribute value different than the first-column collation attribute value;
    identifying a subset of columns of the set of columns, each identified column associated with the collation attribute value different from the client collation attribute value associated with the client application, wherein the first column belongs to the identified subset of columns and the second column is outside of the identified subset of columns;
    generating an execution plan for the database query, the generating comprising, for each identified column in the identified subset of columns, including in the execution plan, a transliterate operator configured to convert a character set of the data stored in the identified column, comprising:
        responsive to determining that the first-column collation attribute value associated with the first column is different from the client collation attribute value, including in the execution plan, the transliterate operator configured to convert the character set of the data stored in the first column;
    executing the execution plan to obtain a query result; and
    providing the query result to the client application.

16. The computer-implemented method of claim 15, further comprising:
    obtaining data stored in each identified column of the identified subset of columns requested by the database query, the obtained data represented in a first character set corresponding to the collation attribute value associated with the column; and
    executing the transliterate operator to convert the obtained data to data represented in a second character set used by the client application, the second character set corresponding to the client collation attribute value associated with the client application.

17. The computer-implemented method of claim 15, further comprising:
    receiving a request to convert the stored data of at least an identified column, the request for changing the character set of stored data of the identified column;
    responsive to receiving the request:
        converting data stored in the column from being represented in a first character set to a second character set, the first character set corresponding to the collation attribute value associated with the column, and the second character set used by the client application corresponding to the client collation attribute value associated with the client application, and
        updating the collation attribute value associated with the column to the client collation attribute value associated with the client application.

18. The computer-implemented method of claim 17, wherein the database query is a first database query, further comprising:
    receiving a second database query processing an identified column of the database table; and
    generating a second execution plan for the second database query, the second execution plan including no transliterate operator.

19. The computer-implemented method of claim 17, further comprising:
    responsive to determining that the conversion of the data stored in the column is complete, updating the collation attribute value associated with the column to the client collation attribute value associated with the client application.

20. The computer-implemented method of claim 16, wherein the first character set is a national character set (NCS) and the second character set is a UTF-8 character set.

* * * * *